United States Patent Office 3,276,855
Patented Oct. 4, 1966

3,276,855
N-ALKYLMERCAPTO-UREAS AND A METHOD
FOR CONTROLLING WEEDS
Sidney B. Richter, Chicago, Ill., assignor to Velsicol
Chemical Corporation, Chicago, Ill., a corporation of
Illinois
No Drawing. Filed Jan. 4, 1962, Ser. No. 164,378
6 Claims. (Cl. 71—2.6)

This invention relates to new compositions of matter. In particular this invention relates to new herbicidally active compositions.

A long established problem is the uncontrolled growth of plants. In some instances, this growth takes place in open areas in which there is no desired vegetation. Thus for example, vacant lots and railroad right-of-ways generally contain such growth. In combatting these weeds it is necessary to use a product having broad herbicidal properties without regard as to its effect on surrounding plant growth.

In other instances of perhaps greater economic importance is the growth of undesired plants in areas wherein desired plants similarly grow. In this case the presence of the weeds causes great injury since it prevents the normal growth of the planted item and decreases the productivity of the land. Here it is necessary to use herbicidally active products which will not injure the economic plants but will control and destroy the weeds. It is extremely difficult if not impossible to devise a single material for all purposes since the type of plants which are weeds in one instance can in another usage be a desired crop. Accordingly there is a never ending need for new herbicides especially those which are selective in that they will only adversely affect the growth of the weeds.

Unexpectedly it has been found that the compositions of the present invention possess superior herbicidal activity. The compositions of the present invention have the following chemical formula $$\begin{array}{c} \text{H} \quad \text{O} \\ | \quad \parallel \\ \text{A—N—C—N—X—Y} \\ | \\ \text{Z} \end{array}$$

wherein X is selected from the group consisting of oxygen and sulfur, Y is an unsubstituted hydrocarbon radical containing from 1 to 4 carbon atoms, Z is selected from the group consisting of hydrogen and unsubstituted hydrocarbon radicals containing from 1 to 4 carbon atoms, A is selected from the group consisting of

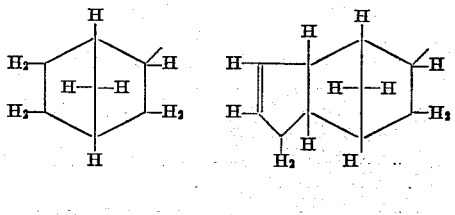

and

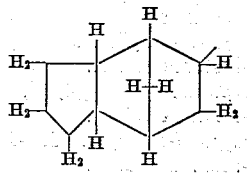

As can be seen from the foregoing structural representations, these compositions have unique configurations containing as critical portions thereof a polycyclic portion and an alkoxy or mercapto alkyl substituted ureido group.

While the method of preparing the present compounds is not critical to the present invention which is directed to the compositions and their use as herbicides, the present compounds can be obtained by reacting a suitable isocyanate and an appropriately substituted amine.

The amine reactant necessary for this reaction is substituted in accordance with the desired X, Y and Z substituents of the final product since these substituents are not altered by the reaction with the isocyanate. Thus its formula is: NH(XY)(Z). Suitable amines can be prepared, for example, by the reduction of the corresponding oximes as described by Jones and Major, J. Am. Chem. Soc., vol. 52, pp. 669–79 (1930). Amines of the type HN(Z)(SY) have been disclosed in United States Patent 2,877,749, granted March 17, 1959, and can be prepared, for example, by treating a sulfenyl halide with an equimolar amount of an amine in the presence of an equimolar amount of aqueous NaOH as shown in United States Patent 2,520,400, granted August 29, 1950.

The substituted amine can be used conveniently in the form of one of its acid salts, such as the hydrochloride or sulfate, which will often be soluble in water. The free amine can be released in the reaction by the addition of a mild base, such as sodium carbonate, potassium carbonate, or the like.

Suitable isocyanate reactants can be obtained by reacting the corresponding amine wth phosgene. Thus by reacting a suitable bicyclo (2.2.1)-heptanyl amine with phosgene there is obtained a bicyclo (2.2.1)-heptanyl isocyanate.

Similarly the required isocyanate reactant has the formula ANCO wherein A is identical to the A of the final product. Thus in order to obtain a particular compound of the present invention a selection must be made of the specific amine and isocyanate reactants containing the required A, X, Y and Z substituents. This reaction can be performed at low temperatures preferably below 0° C. An inert solvent can be used to facilitate this reaction. Such solvents as the lower paraffins are acceptable and other solvents provided they are inert, such as benzene, are satisfactory. Similarly the process can be performed at atmospheric pressure, although pressures below or above atmospheric may be used.

The reaction may be complete in less than one hour, but frequently several hours of reaction time will be required. The product can be isolated, for example, by removing the solvent from the organic layer of the reaction mixture. While the product which is obtained in this manner is often sufficiently pure for pesticidal purposes as such, it can be purified by recrystallization, distillation, chromatography, or other techniques known to the art.

The following examples illustrate this reaction, it being understood that isocyanates and amines useful as reactants possessing the desired A, X, Y and Z substituents can be substituted for the reactants of the following examples.

EXAMPLE 1

Preparation of 2-(N-methoxy-N-methylureido)-bicyclo (2.2.1)-heptane

Anhydrous N-methoxy-N-methylamine (6.1 grams; 0.1 mol) is placed in a three-necked glass reaction flask equipped with stirrer, thermometer, and Dry-Ice-acetone bath and containing hexane (60 grams). Bicyclo (2.2.1)-heptanyl isocyanate (13.7 grams; 0.1 mol) is added thereto with continuous stirring at a temperature of about 0° C. The desired product is recovered by filtration.

EXAMPLE 2

Preparation of 5-(N-methoxy-N-methylureido)-$3_{(a)},4,5,6,7,7_{(a)}$-hexahydro-4,7-methanoindene Anhydrous N-methoxy-N-methylamine (6.1 grams; 0.1 mol) is placed in a three-necked glass reaction flask equipped with stirrer, thermometer, and Dry-Ice-acetone bath and containing hexane (60 grams). $3_{(a)},4,5,6,7,7_{(a)}$-hexahydro-5-isocyano-4,7-methanoindene (17.5 grams; 0.1 mol) is added thereto with continuous stirring at a temperature of about 0° C. The desired product is recovered by filtration.

EXAMPLE 3

*Preparation of 5-(N-methoxy-N-methylureido)-$3_{(a)},4,5,6,7,7_{(a)}$-hexahydro-4,7-methanoindene*

Anhydrous N-methoxy-N-methyl amine (6.1 grams; 0.1 mol) is placed in a three-necked glass reaction flask equipped with stirrer, thermometer, and Dry Ice-acetone bath and containing hexane (60 grams). $3_{(a)},4,5,6,7,7_{(a)}$-hexahydro-5-isocyano-4,7-methanoindene (17.7 grams; 0.1 mol) is added thereto with continuous stirring at a temperature of 0° C. The desired product is recovered by filtration.

As previously indicated the amine and isocyanate reactants in the foregoing examples can be appropriately substituted in order to obtain the various compounds of the present invention. Thus, e.g., by using N-methoxyamine in Example 1 as a substitute for N-methoxy-N-methyl amine there is obtained 2-(N-methoxyureido)-bicyclo (2.2.1)-heptane; by using N-propoxy-N-propylamine in Example 2 as a substitute for N-methoxy-N-methyl amine there is obtained 5-(N-propoxy-N-propylureido)-$3_{(a)},4,5,6,7,7_{(a)}$-hexahydro-4,7-methanoindene.

Compounds within the scope of the present invention include the following:

2-(N-methoxyureido)-bicyclo (2.2.1)-heptane.
2-(N-methoxy-N-methylureido)-bicyclo (2.2.1)-heptane.
2-(N-methoxy-N-ethylureido)-bicyclo (2.2.1)-heptane.
2-(N-methoxy-N-propylureido)-bicyclo (2.2.1)-heptane.
2-(N-methoxy-N-butylureido)-bicyclo (2.2.1)-heptane.
2-(N-ethoxyureido)-bicyclo (2.2.1)-heptane.
2-(N-ethoxy-N-methylureido)-bicyclo (2.2.1)-heptane.
2-(N-ethoxy-N-ethylureido)-bicyclo (2.2.1)-heptane.
2-(N-ethoxy-N-propylureido)-bicyclo (2.2.1)-heptane.
2-(N-ethoxy-N-butylureido)-bicyclo (2.2.1)-heptane.
2-(N-propoxyureido)-bicyclo (2.2.1)-heptane.
2-(N-propoxy-N-methylureido)-bicyclo (2.2.1)-heptane.
2-(N-propoxy-N-ethylureido)-bicyclo (2.2.1)-heptane.
2-(N-propoxy-N-propylureido)-bicyclo (2.2.1)-heptane.
2-(N-propoxy-N-butylureido)-bicyclo (2.2.1)-heptane.
2-(N-methyl mercaptoureido)-bicyclo (2.2.1)-heptane.
2-(N-methyl ethylureido)-bicyclo (2.2.1)-heptane.
2-(N-methyl propylureido)-bicyclo (2.2.1)-heptane.
2-(N-methyl butylureido)-bicyclo (2.2.1)-heptane.
2-(N-methyl mercaptoureido)-bicyclo (2.2.1)-heptane.
2-(N-methyl mercapto-N-methylureido)-bicyclo (2.2.1)-heptane.
2-(N-methyl mercapto-N-ethylureido)-bicyclo (2.2.1)-heptane.
2-(N-methyl mercapto-N-propylureido)-bicyclo (2.2.1)-heptane.
2-(N-methyl mercapto-N-butylureido)-bicyclo (2.2.1)-heptane.
2-(N-ethyl mercaptoureido)-bicyclo (2.2.1)-heptane.
2-(N-ethyl mercapto-N-methylureido)-bicyclo 2.2.1)-heptane.
2-(N-ethyl mercapto-N-ethylureido)-bicyclo (2.2.1)-heptane.
2-(N-ethyl mercapto-N-propylureido)-bicyclo (2.2.1)-heptane.
2-(N-ethyl mercapto-N-butylureido)-bicyclo (2.2.1)-heptane.
2-(N-propylmercaptoureido)-bicyclo (2.2.1)-heptane.
2-(N-propylmercapto-N-methylureido)-bicyclo (2.2.1)-heptane.
2-(N-propylmercapto-N-ethylureido)-bicyclo (2.2.1)-heptane.
2-(N-propylmercapto-N-propylureido)-bicyclo (2.2.1)-heptane.
2-(N-propylmercapto-N-butylureido)-bicyclo (2.2.1)-heptane.
2-(N-butylmercaptoureido)-bicyclo (2.2.1)-heptane.
2-(N-butylmercapto-N-butylureido)-bicyclo (2.2.1)-heptane.
5-(N-methoxyureido)-$3_{(a)},4,5,6,7,7_{(a)}$-hexahydro-4,7-methanoindene.
5-(N-methoxy-N-methylureido)-$3_{(a)},4,5,6,7,7_{(a)}$-hexahydro-4,7-methanoindene.
5-(N-methoxy-N-ethylureido)-$3_{(a)},4,5,6,7,7_{(a)}$-hexahydro-4,7-methanoindene.
5-(N-methoxy-N-propylureido)-$3_{(a)},4,5,6,7,7_{(a)}$-hexahydro-4,7-methanoindene.
5-(N-methoxy-N-butylureido)-$3_{(a)},4,5,6,7,7_{(a)}$-hexahydro-4,7-methanoindene.
5-(N-ethoxyureido)-$3_{(a)},4,5,6,7,7_{(a)}$-hexahydro-4,7-methanoindene.
5-(N-ethoxy-N-methylureido)-$3_{(a)},4,5,6,7,7_{(a)}$-hexahydro-4,7-methanoindene.
5-(N-ethoxy-N-ethylureido)-$3_{(a)},4,5,6,7,7_{(a)}$-hexahydro-4,7-methanoindene.
5-(N-ethoxy-N-propylureido)-$3_{(a)},4,5,6,7,7_{(a)}$-hexahydro-4,7-methanoindene.
5-(N-ethoxy-N-butylureido)-$3_{(a)},4,5,6,7,7_{(a)}$-hexahydro-4,7-methanoindene.
5-(N-propoxyureido)-$3_{(a)},4,5,6,7,7_{(a)}$-hexahydro-4,7-methanoindene.
5-(N-propoxy-N-methylureido)-$3_{(a)},4,5,6,7,7_{(a)}$-hexahydro-4,7-methanoindene.
5-(N-propoxy-N-ethylureido)-$3_{(a)},4,5,6,7,7_{(a)}$-hexahydro-4,7-methanoindene.
5-(N-propoxy-N-propylureido)-$3_{(a)},4,5,6,7,7_{(a)}$-hexahydro-4,7-methanoindene.
5-(N-propoxy-N-butylureido)-$3_{(a)},4,5,6,7,7_{(a)}$-hexahydro-4,7-methanoindene.
5-(N-methyl mercaptoureido)-$3_{(a)},4,5,6,7,7_{(a)}$-hexahydro-4,7-methanoindene.
5-(N-methyl ethylureido)-$3_{(a)},4,5,6,7,7_{(a)}$-hexahydro-4,7-methanoindene.
5-(N-methyl propylureido)-$3_{(a)},4,5,6,7,7_{(a)}$-hexahydro-4,7-methanoindene.
5-(N-methyl butylureido)-$3_{(a)},4,5,6,7,7_{(a)}$-hexahydro-4,7-methanoindene.
5-(N-methyl mercaptoureido)-$3_{(a)},4,5,6,7,7_{(a)}$-hexahydro-4,7-methanoindene.
5-(N-methyl mercapto-N-methylureido)-$3_{(a)},4,5,6,7,7_{(a)}$-hexahydro-4,7-methanoindene.
5-(N-methyl mercapto-N-ethylureido)-$3_{(a)},4,5,6,7,7_{(a)}$-hexahydro-4,7-methanoindene.
5-(N-methyl mercapto-N-propylureido)-$3_{(a)},4,5,6,7,7_{(a)}$-hexahydro-4,7-methanoindene.
5-(N-methyl mercapto-N-butylureido)-$3_{(a)},4,5,6,7,7_{(a)}$-hexahydro-4,7-methanoindene.
5-(N-ethyl mercaptoureido)-$3_{(a)},4,5,6,7,7_{(a)}$-hexahydro-4,7-methanoindene.
5-(N-ethyl mercapto-N-methylureido)-$3_{(a)},4,5,6,7,7_{(a)}$-hexahydro-4,7-methanoindene.
5-(N-ethyl mercapto-N-ethylureido)-$3_{(a)},4,5,6,7,7_{(a)}$-hexahydro-4,7-methanoindene.
5-(N-ethyl mercapto-N-propylureido)-$3_{(a)},4,5,6,7,7_{(a)}$-hexahydro-4,7-methanoindene.
5-(N-ethyl mercapto-N-butylureido)-$3_{(a)},4,5,6,7,7_{(a)}$-hexahydro-4,7-methanoindene.
5-(N-propylmercaptoureido)-$3_{(a)},4,5,6,7,7_{(a)}$-hexahydro-4,7-methanoindene.
5-(N-propylmercapto-N-methylureido)-$3_{(a)},4,5,6,7,7_{(a)}$-hexahydro-4,7-methanoindene.
5-(N-propylmercapto-N-ethylureido)-$3_{(a)},4,5,6,7,7_{(a)}$-hexahydro-4,7-methanoindene.
5-(N-propylmercapto-N-propylureido)-$3_{(a)},4,5,6,7,7_{(a)}$-hexahydro-4,7-methanoindene.
5-(N-propylmercapto-N-butylureido)-$3_{(a)},4,5,6,7,7_{(a)}$-hexahydro-4,7-methaniondene.

5-(N-butylmercaptoureido)-3$_{(a)}$,4,5,6,7,7$_{(a)}$-hexahydro-4,7-methanoindene.
5-(N-butylmercapto-N-butylureido)-3$_{(a)}$,4,5,6,7,7$_{(a)}$-hexahydro-4,7-methanoindene.
5-(N-methoxyureido)-3$_{(a)}$,4,5,6,7,7$_{(a)}$-hexahydro-4,7-methanoindane.
5-(N-methoxy-N-methylureido)-3$_{(a)}$,4,5,6,7,7$_{(a)}$-hexahydro-4,7-methanoindane.
5-(N-methoxy-N-ethylureido)-3$_{(a)}$,4,5,6,7,7$_{(a)}$-hexahydro-4,7-methanoindane.
5-(N-methoxy-N-propylureido)-3$_{(a)}$,4,5,6,7,7$_{(a)}$-hexahydro-4,7-methanoindane.
5-(N-methoxy-N-butylureido)-3$_{(a)}$4,5,6,7,7$_{(a)}$-hexahydro-4,7-methanoindane.
5-(N-ethoxyureido)-3$_{(a)}$,4,5,6,7,7$_{(a)}$-hexahydro-4,7-methanoindane.
5-(N-ethoxy-N-methylureiodo)-3$_{(a)}$,4,5,6,7,7$_{(a)}$-hexahydro-4,7-methanoindane.
5-(N-ethoxy-N-ethylureido)-3$_{(a)}$,4,5,6,7,7$_{(a)}$-hexahydro-4,7-methanoindane.
5-(N-ethoxy-N-propylureido)-3$_{(a)}$,4,5,6,7,(a)-hexahydro-4,7-methanoindane.
5-(N-ethoxy-N-butylureido)-3$_{(a)}$,4,5,6,7,7$_{(a)}$-hexahydro-4,7-methanoindane.
5-(N-propoxyureido)-3$_{(a)}$,4,5,6,7$_{(a)}$-hexahydro-4,7-methanoindane.
5-(N-propoxy-N-methylureido)-3$_{(a)}$,4,5,6,7,7$_{(a)}$-hexahydro-4,7-methanoindane.
5-(N-propoxy-N-ethylureido)-3$_{(a)}$,4,5,6,7,7$_{(a)}$-hexahydro-4,7-methanoindane.
5-(N-propoxy-N-propylureido)-3$_{(a)}$,4,5,6,7,7$_{(a)}$-hexahydro-4,7-methanoindane.
5-(N-propoxy-N-butylureido)-3$_{(a)}$,4,5,6,7,7$_{(a)}$-hexahydro-4,7-methanoindane.
5-(N-methyl mercaptoureido)-3$_{(a)}$,4,5,6,7,7$_{(a)}$-hexahydro-4,7-methanoindane.
5-(N-methyl ethylureido)-3$_{(a)}$,4,5,6,7,7$_{(a)}$-hexahydro-4,7-methanoindane.
5-(N-methyl proplylureiodo)-3$_{(a)}$,4,5,6,7,7$_{(a)}$-hexahydro-4,7-methanoindane.
5-(N-methyl butylureido)-3$_{(a)}$,4,5,6,7,7$_{(a)}$-hexahydro-4,7-methanoindane.
5-(N-methyl mercaptoureido)-3$_{(a)}$,4,5,6,7,7$_{(a)}$-hexahydro-4,7-methanoindane.
5-(N-methyl mercapto-N-methylureido)-3$_{(a)}$,4,5,6,7,7$_{(a)}$-hexahydro-4,7-methanoindane.
5-(N-methyl mercapto-N-ethylureido)-3$_{(a)}$,4,5,6,7,7$_{(a)}$-hexahydro-4,7-methanoindane.
5-(N-methyl mercapto-N-propylureido)-3$_{(a)}$,4,5,6,7,7$_{(a)}$-hexahydro-4,7-methanoindane.
5-(N-methyl mercapto-N-butylureido)-3$_{(a)}$,4,5,6,7,7$_{(a)}$-hexahydro-4,7-methanoindane.
5-(N-ethyl mercaptoureido)-3$_{(a)}$,4,5,6,7,7$_{(a)}$-hexahydro-4,7-methanoindane.
5-(N-ethyl mercapto-N-methylureido)-3$_{(a)}$,4,5,6,7,7$_{(a)}$-hexahydro-4,7-methanoindane.
5-(N-ethyl mercapto-N-ethylureido)-3$_{(a)}$,4,5,6,7,7$_{(a)}$-hexahydro-4,7-methanoindane.
5-(N-ethyl mercapto-N-propylureido)-3$_{(a)}$,4,5,6,7,7$_{(a)}$-hexahydro-4,7-methanoindane.
5-(N-ethyl mercapto-N-butylureido)-3$_{(a)}$,4,5,6,7,7$_{(a)}$-hexahydro-4,7-methanoindane.
5-(N-propylmercaptoureido)-3$_{(a)}$,4,5,6,7,7$_{(a)}$-hexahydro-4,7-methanoindane.
5-(N-propylmercapto-N-methylureido)-3$_{(a)}$,4,5,6,7,7$_{(a)}$-hexahydro-4,7-methanoindane.
5-(N-propylmercapto-N-ethylureido)-3$_{(a)}$,4,5,6,7,7$_{(a)}$-hexahydro-4,7-methanoindane.
5-(N-propylmercapto-N-propylureido)-3$_{(a)}$,4,5,6,7,7$_{(a)}$-hexahydro-4,7-methanoindane.
5-(N-propylmercapto-N-butylureido)-3$_{(a)}$,4,5,6,7,7$_{(a)}$-hexahydro-4,7-methanoindane.
5-(N-butylmercaptoureido)-3$_{(a)}$,4,5,6,7,7$_{(a)}$-hexahydro-4,7-methanoindane.
5-(N-butylmercapto-N-butylureido)-3$_{(a)}$,4,5,6,7,7$_{(a)}$-hexahydro-4,7-methanoindane.

For practical use as pesticides, the compounds of this invention are generally incorporated into pesticidal compositions which comprise an inert carrier and a pesticidally toxic amount of such a compound. Such pesticidal compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, gypsum, calcium carbonate, dolomite, pyrophyllite, pumicite, ground walnut shell, and the like. Granular formulations can be prepared by impregnating the compound, usually dissolved in a suitable solvent, on to and into granulated carriers such as the attapulgites or the vermiculites, usually of a particle size range of from about 0.3 to 1.55 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid pesticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents. A typical emulsifiable concentrate formulation is illustrated in the following example, in which the quantities are in parts by weight.

*Example 4*

| | Percent |
|---|---|
| Product of Example 1 | 25 |
| Aromatic polyethylene glycol ether emulsifier | 5 |
| Xylene | 70 |

The emulsifiable concentrate can be prepared by dissolving the product of Example 1 in the xylene, gentle heating being used if necessary. The emulsifier is then added, and the mixture is stirred until homogeneous. The resulting concentrate can be diluted with water to give the desired concentration of the active compound for application to the site of the pest infestation.

The pesticides of this invention can be applied in any manner recognized by the art. The concentration of the new compounds of this invention in the pesticidal compositions will vary greatly with the type of formulation and the purpose for which it is designed, but generally the pesticidal compositions will comprise from about 0.05 to about 95 percent by weight of the active compounds of this invention. The compositions can also comprise such additional substances as other pesticides, spreaders, adhesive, stickers, fertilizers, activators, synergists, and the like.

Weeds are undesirable plants in their growing where they are not wanted, having no economic value, and interfering with the production of cultivated crops or with the welfare of livestock. Many types of weeds are known, including summer annuals such as pigweed, lamb's-quarters, ragweed, yellow and green foxtail, and crabgrass; winter annuals such as chickweed, wild mustard, shepherd's purse, and penny-cress; biennials such as wild carrot and great burdock; and perennials such as quackgrass, Johnson grass, Canada thistle, hedge bindweed, Bermuda grass, and sheep sorrel. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of only a few ounces of an active compound per acre may be sufficient for good control of a light infestation of weeds growing under adverse conditions, the application of more than one pound of active compound per acre may be required for good control of a dense infestation of hardy weeds growing under favorable conditions.

The herbicidal toxicity of the new compounds of this invention can be illustrated by any of the established test-ting techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

I claim:
1. A compound of the formula

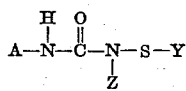

wherein Y is an unsubstituted alkyl radical containing from 1 to 4 carbon atoms, Z is selected from the group consisting of hydrogen and unsubstituted alkyl radicals containing from 1 to 4 carbon atoms, A is selected from the group consisting of

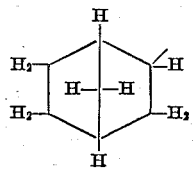

and

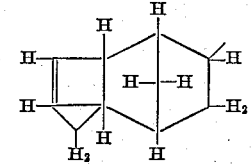

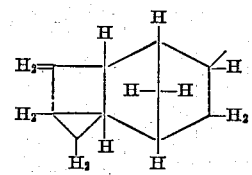

2. 2 - (N - methylmercapto - N - methylureido)-bicyclo (2.2.1)-heptane.
3. 2-(N-methyl mercaptoureido)-bicyclo (2.2.1)-heptane.
4. 5 - (N-methylmercapto-N-methylureido)-3$_{(a)}$,4,5,6, 7,7$_{(a)}$-hexahydro-4,7-methanoindene.
5. 5-(N-methyl mercaptoureido)-3$_{(a)}$,4,5,6,7,7$_{(a)}$-hexahydro-4,7-methanoindene.
6. A method for the control of undesirable plant growth which comprises applying to the locus of said plants an effective quantity of the composition of a compound of the formula

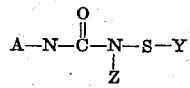

wherein Y is an unsubstituted alkyl radical containing from 1 to 4 carbon atoms, Z is selected from the group consisting of hydrogen and unsubstituted alkyl radicals containing from 1 to 4 carbon atoms, A is selected from the group consisting of

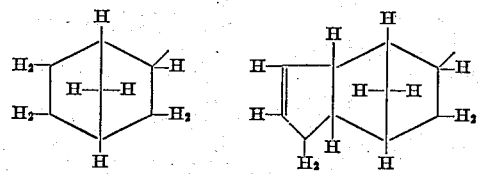

and

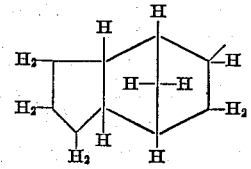

References Cited by the Examiner
UNITED STATES PATENTS

| | | | |
|---|---|---|---|
| 2,704,245 | 3/1955 | Searle | 71—2.6 |
| 2,705,195 | 3/1955 | Cupery et al. | 71—2.6 |
| 2,928,873 | 3/1960 | Shapiro et al. | 260—553 |
| 2,942,026 | 6/1960 | Boehme et al. | 260—553 |

HENRY R. JILES, *Acting Primary Examiner.*

IRVING MARCUS, NICHOLAS RIZZO, WALTER A. MODANCE, *Examiners.*

UNITED STATES PATENT OFFICE
CERTIFICATE OF CORRECTION

Patent No. 3,276,855

October 4, 1966

Sidney B. Richter

It is hereby certified that error appears in the above numbered patent requiring correction and that the said Letters Patent should read as corrected below.

Column 3, line 64, for "2.2.1)-heptane." read -- (2.2.1)-heptane. --; column 5, line 17, for "methylureido" read -- methylureido --; lines 22 and 25, for "$3_{(a)},4,5,6,7,_{(a)}$" read -- $3_{(a)},4,5,6,7,7_{(a)}$ --; line 39, for "proplylureiodo" read -- propylureido --; column 7, lines 51 to 57, the right-hand portion of the formula should appear as shown below instead of as in the patent;

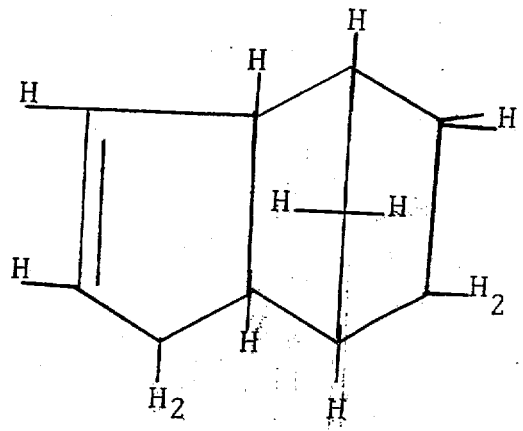

column 8, lines 2 to 9, the formula should appear as shown below instead of as in the patent:

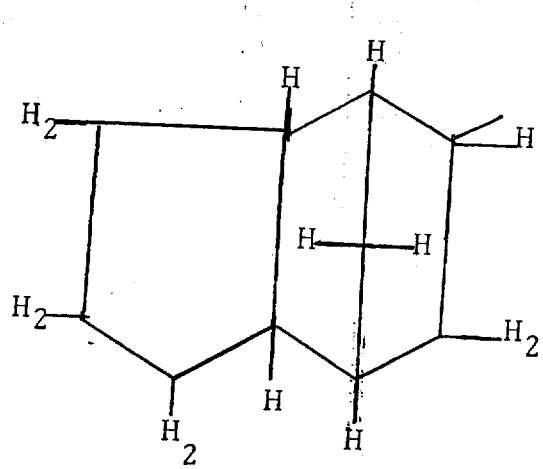

3,276,855 same column 8, lines 22 to 25, the formula should appear as shown below instead of as in the patent:

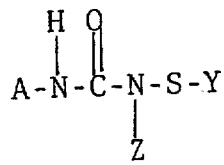

Signed and sealed this 5th day of September 1967.

(SEAL)
Attest:

ERNEST W. SWIDER
Attesting Officer

EDWARD J. BRENNER
Commissioner of Patents